Patented Mar. 11, 1952

2,588,922

UNITED STATES PATENT OFFICE 2,588,922

METHOD AND MEANS OF IMPROVING COFFEE FLAVOR

Earl P. Haney, Winchester, Mass.

No Drawing. Application April 9, 1951,
Serial No. 220,135

4 Claims. (Cl. 99—152)

The present invention relates to an improvement in a coffee product which preserves and brings out the actual coffee flavor, particularly in roasted ground coffee.

The product of the present invention is substantially of coffee inasmuch as the other ingredients combined form a percent which is less than $\frac{1}{10}$ of 1%. The purpose of the product is to provide actually a coffee in which the flavor is fixed and slightly fortified so that the fused grounds will have an improved taste and also so that the coffee when stored will retain its flavor longer.

In the present product the free tannic acid or its compounds tend to be neutralized when the coffee grounds remain in water after brewing, and also the bitter and astringent taste and effect commonly found when coffee is boiled is ameliorated.

In the present invention to one pound of roasted ground coffee there is added one grain asafetida gum resin or the equivalent of the oil in a dry state, that is absorbed by some dry medium which may be four grains of gelatine of any suitable edible kind. The two substances may be mixed as a compound in roasted, ground coffee when the coffee is packed, either in vacuum or other containers. The asafetida may be of any of the usual substances, such as *Ferula foetida, Ferula globanifula* or other substances of Ferula or asafetida or substances which contain oils and aromatic principles. The asafetida may be used alone and not in combination with the edible gelatin, but I prefer to use the combination together since one pound of coffee contains 7000 grains avoirdupois it is evident that the amount of asafetida is extremely small. The asafetida stabilizes the flavor of brand coffee particularly when these brands are blended of different types of coffee and therefore tends to overcome the variations of one batch or shipment from another and therefore results in a more uniform flavor for the particular brand.

The asafetida in the quantities used give no definite taste or flavor of its own and therefore may be used with all kinds of coffee without changing their basic characteristics. The asafetida and edible gelatin are preferably added to the coffee during the grinding process and evenly mixed in it before the coffee is placed in a sealed container. However, if desired the asafetida and gelatin may be added to the coffee in sealed containers of their own and mixed with the coffee by the consumer when the can or package is opened.

As stated above, however, the mixture before packing also tends to act as a fixative and preservative so that the more proper use is to incorporate these substances when the coffee is packed.

The volatile oil and flavor of the gum resin asafetida reacts readily with the oxygen present in the partial vacuum packed hermetically sealed containers and by consuming this oxygen it prevents the escape of the flavor from the particles of ground coffee thus preserving a high percentage of strength and flavor which otherwise would be lost. As has been indicated the oils and flavors of the asafetida combine with the natural coffee flavors to intensify and fortify the delicate flavors and aroma and therefore serve in effect as a synergist.

The gelatine content neutralizes a portion of the soluble volatile acids that increase with the age of the coffee and helps overcome the tendency for cream to curdle when it is used. The gelatine also smooths the bitter taste of the caffeine or tannic acid compounds.

The active flavoring principles of asafetida also help prevent the rapid decomposition of the coffee flavor after the coffee has been brewed so that after standing and cooling the coffee treated with this product retains a large proportion of the original flavor resembling the flavor when it was first brewed.

Having now described my invention, I claim:

1. A product comprising substantially in proportion one part asafetida gum resin, four parts powdered edible gelatine, 7000 parts roasted ground coffee thoroughly mixed together.

2. A process for improving and retaining flavor in roasted ground coffee which comprises adding to freshly roasted, ground coffee, one part asafetida and four parts edible gelatine in powdered form the total five parts being not greater than 0.1% of the coffee.

3. A process for improving and retaining flavor in coffee which comprises adding to freshly roasted, ground coffee, one part asafetida and four parts edible gelatine in powdered form, the total five parts being not greater than 0.1% of the coffee and thereafter packing the ground coffee in vacuum or partial vacuum packages.

4. A process for improving the flavor and taste of coffee which comprises adding to the coffee substantially one grain asafetida gum resin to one pound of roasted ground coffee.

EARL P. HANEY.

REFERENCES CITED

The following references are of record in the file of this patent:

UNITED STATES PATENTS

| Number | Name | Date |
|---|---|---|
| 2,069,265 | Musher | Feb. 2, 1937 |
| 2,198,206 | Musher | Apr. 23, 1940 |
| 2,430,663 | Behrman | Nov. 11, 1947 |

FOREIGN PATENTS

| Number | Country | Date |
|---|---|---|
| 3,131 | Great Britain | of 1866 |